(12) United States Patent
Saito et al.

(10) Patent No.: US 8,854,322 B2
(45) Date of Patent: Oct. 7, 2014

(54) IMAGE PROCESSING APPARATUS, COMPUTER READABLE MEDIUM, AND IMAGE PROCESSING METHOD

(75) Inventors: Kazuo Saito, Yokohama (JP); Takanori Nakanowatari, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 445 days.

(21) Appl. No.: 13/190,205

(22) Filed: Jul. 25, 2011

(65) Prior Publication Data

US 2012/0182232 A1  Jul. 19, 2012

(30) Foreign Application Priority Data

Jan. 14, 2011 (JP) ................... 2011-005841

(51) Int. Cl.
| | |
|---|---|
| G06F 3/038 | (2013.01) |
| G06F 3/033 | (2013.01) |
| G06F 3/03 | (2006.01) |
| G06F 3/00 | (2006.01) |
| G06T 1/00 | (2006.01) |
| H04N 1/387 | (2006.01) |

(52) U.S. Cl.
CPC . *G06T 1/00* (2013.01); *H04N 1/387* (2013.01)
USPC .......................................... 345/173; 345/179

(58) Field of Classification Search
USPC .......... 345/156, 173, 179; 358/3.28; 401/195; 715/210, 224; 726/1
See application file for complete search history.

(56) References Cited

U.S. PATENT DOCUMENTS

| 7,231,601 B2 | 6/2007 | Sako et al. | |
|---|---|---|---|
| 2007/0139399 A1* | 6/2007 | Cook ........................... | 345/179 |

FOREIGN PATENT DOCUMENTS

| JP | 06-075795 A | 3/1994 |
|---|---|---|
| JP | 06-103390 A | 4/1994 |
| JP | 2003-263267 A | 9/2003 |

* cited by examiner

*Primary Examiner* — Dwayne Bost
*Assistant Examiner* — Sepehr Azari
(74) *Attorney, Agent, or Firm* — Sughrue Mion, PLLC

(57) ABSTRACT

An image processing apparatus includes an image output apparatus and an image reading apparatus. The image output apparatus includes a writing tool information receiving unit that receives writing tool information, an information image generating unit that generates an information image, a combining unit that combines the information image with an input field in a document, and a first output unit that outputs the document onto a medium. The image reading apparatus includes a writing tool information memory that stores writing tool information, a reading unit that reads an information image that has been output onto a medium by the image output apparatus and that is used for extracting a writing position, an extracting unit that analyzes the information image, thereby extracting writing tool information, and a determining unit that determines whether or not the writing tool is suitable as a writing tool for performing writing.

20 Claims, 13 Drawing Sheets

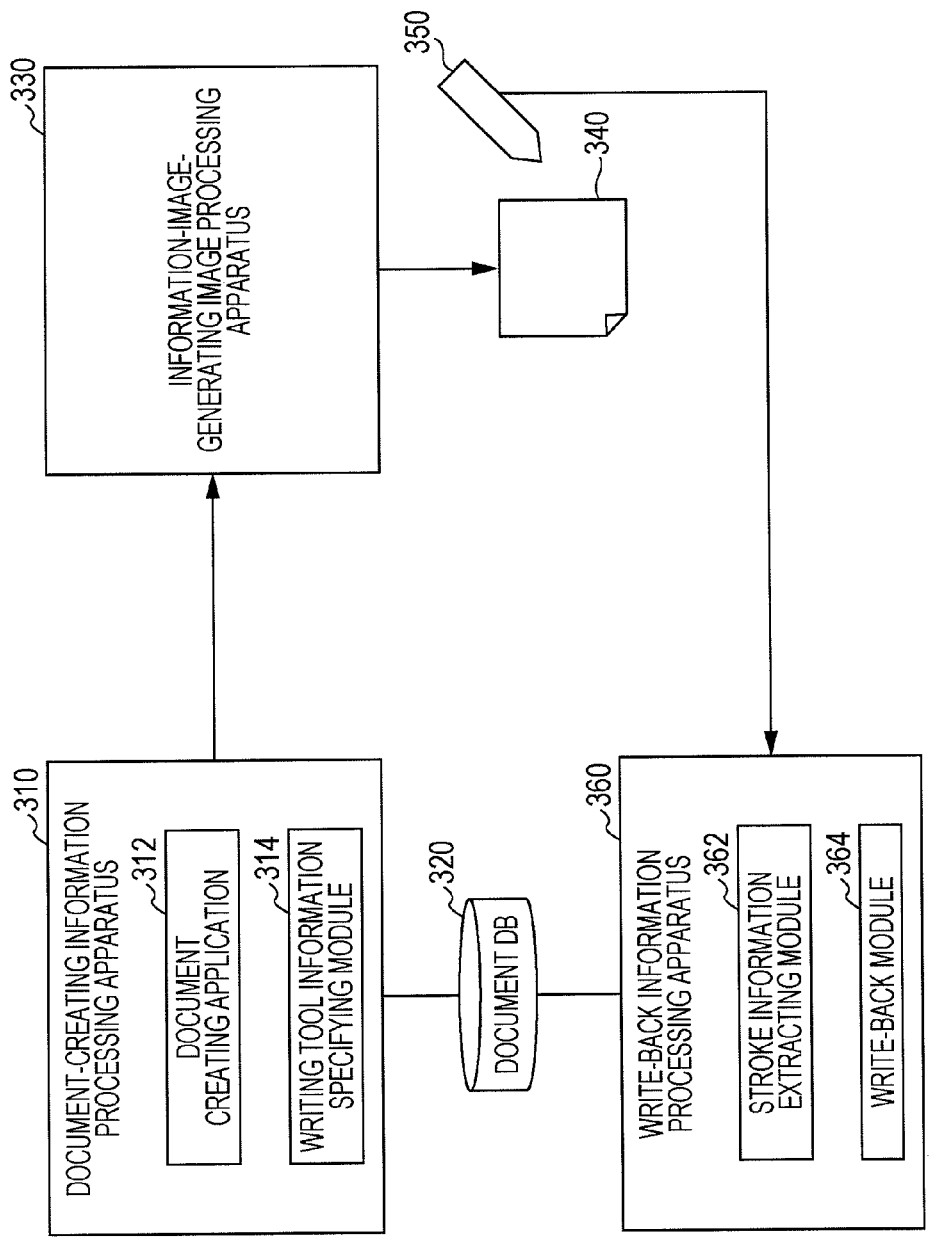

FIG. 5

| INPUT FIELD ID | WRITING TOOL INFORMATION |
|---|---|
| INPUT FIELD a | GENERAL |
| INPUT FIELD b | GENERAL |
| INPUT FIELD c | SETTLEMENT |
| ... | ... |

FIG. 6

| DOCUMENT ID | PAGE ID | WRITING TOOL INFORMATION |
|---|---|---|
| 12345 | 1 | GENERAL |

FIG. 7

| DOCUMENT ID | WRITING TOOL INFORMATION |
|---|---|
| ABCD | GENERAL |

FIG. 8

| INPUT FIELD ID | POSITION | HEIGHT | WIDTH |
|---|---|---|---|
| INPUT FIELD a | (Xa, Ya) | H | W |
| INPUT FIELD b | (Xb, Yb) | H | W |
| INPUT FIELD c | (Xc, Yc) | H | W |
| ... | ... | ... | ... |

PATTERN 0

PATTERN 1

FIG. 12
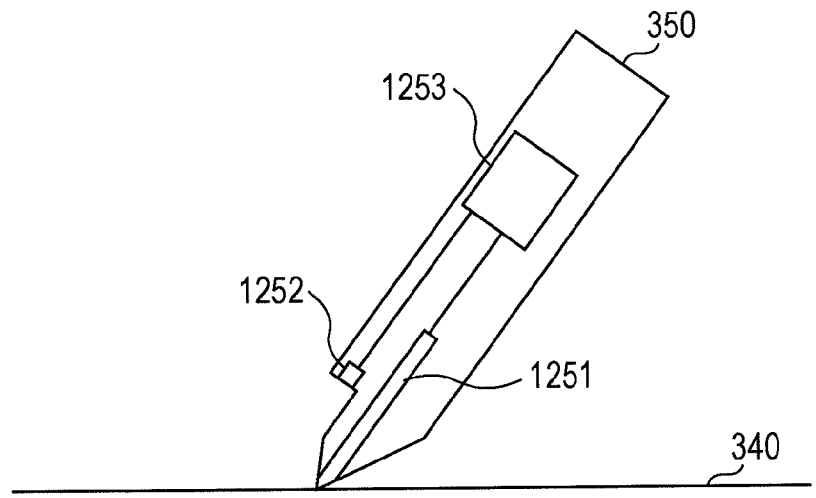
FIG. 13
| DOCUMENT ID | X COORDINATE | Y COORDINATE |
|---|---|---|
| 12345 | 100 | 100 |
| 12345 | 104 | 100 |
| 12345 | 105 | 102 |
| ... | ... | ... |
FIG. 14
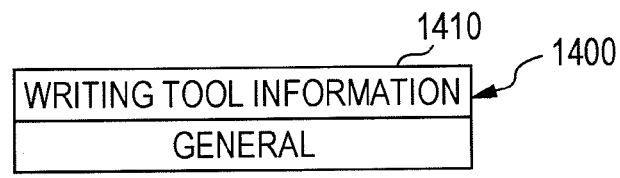

FIG. 17

| INPUT FIELD ID 1710 | WRITING TOOL INFORMATION NAME A 1720 | WRITING TOOL INFORMATION A 1730 | WRITING TOOL INFORMATION NAME B 1740 | WRITING TOOL INFORMATION B 1750 |
|---|---|---|---|---|
| INPUT FIELD a | INPUT AUTHORITY | GENERAL | COLOR OF INK | BLACK |
| INPUT FIELD b | INPUT AUTHORITY | GENERAL | COLOR OF INK | BLUE |
| INPUT FIELD c | INPUT AUTHORITY | SETTLEMENT | COLOR OF INK | RED |
| ... | ... | ... | ... | ... |

| WRITING TOOL INFORMATION NAME A 1810 | WRITING TOOL INFORMATION A 1820 | WRITING TOOL INFORMATION NAME B 1830 | WRITING TOOL INFORMATION B 1840 | WRITING TOOL INFORMATION NAME C 1850 | WRITING TOOL INFORMATION C 1860 |
|---|---|---|---|---|---|
| INPUT AUTHORITY | GENERAL | JOB TITLE | G2 LEADER ID | COLOR OF INK | BLUE |

1800

IMAGE PROCESSING APPARATUS, COMPUTER READABLE MEDIUM, AND IMAGE PROCESSING METHOD

CROSS-REFERENCE TO RELATED APPLICATIONS

This application is based on and claims priority under 35 USC 119 from Japanese Patent Application No. 2011-005841 filed Jan. 14, 2011.

BACKGROUND (i) Technical Field

The present invention relates to an image processing apparatus, a computer readable medium, and an image processing method.

(ii) Related Art

There are technologies related to a configuration of an information image placed on a recording medium and control of reading information written on a recording medium on which an information image is placed.

SUMMARY

According to an aspect of the invention, there is provided an image processing apparatus including an image output apparatus and an image reading apparatus. The image output apparatus includes a writing tool information receiving unit that receives writing tool information, which is information about a writing tool for an input field in a document, an information image generating unit that generates an information image, which is an image representing information, on the basis of position information representing a position in the document and the writing tool information received by the writing tool information receiving unit, a combining unit that combines the information image generated by the information image generating unit with the input field in the document, and a first output unit that outputs the document in which the information image has been combined by the combining unit onto a medium. The image reading apparatus includes a writing tool information memory that stores writing tool information, which is information about a writing tool, a reading unit that reads an information image that has been output onto a medium by the image output apparatus and that is used for extracting a writing position where writing is performed with the writing tool, an extracting unit that analyzes the information image read by the reading unit, thereby extracting writing tool information, and a determining unit that compares the writing tool information extracted by the extracting unit with the writing tool information stored in the writing tool information memory, thereby determining whether or not the writing tool is suitable as a writing tool for performing writing at a position where reading has been performed by the reading unit.

BRIEF DESCRIPTION OF THE DRAWINGS

Exemplary embodiment(s) of the present invention will be described in detail based on the following figures, wherein:

FIG. 3 is an explanatory diagram illustrating an example system configuration for realizing the exemplary embodiment;

FIG. 5 is an explanatory diagram illustrating an example data structure of an input field/writing tool information table;

FIG. 6 is an explanatory diagram illustrating an example data structure of a document/page/writing tool information table;

FIG. 7 is an explanatory diagram illustrating an example data structure of a document/writing tool information table;

FIG. 8 is an explanatory diagram illustrating an example data structure of a document layout table;

FIG. 12 is an explanatory diagram illustrating an example structure of a digital pen;

FIG. 13 is an explanatory diagram illustrating an example data structure of a stroke information table;

FIG. 14 is an explanatory diagram illustrating an example data structure of a writing tool information table;

FIG. 17 is an explanatory diagram illustrating an example data structure of an input field/writing tool information table;

FIG. 18 is an explanatory diagram illustrating an example data structure of a writing tool information table.

DETAILED DESCRIPTION

Hereinafter, an exemplary embodiment of the present invention will be described with reference to the attached drawings.

Figure 1:
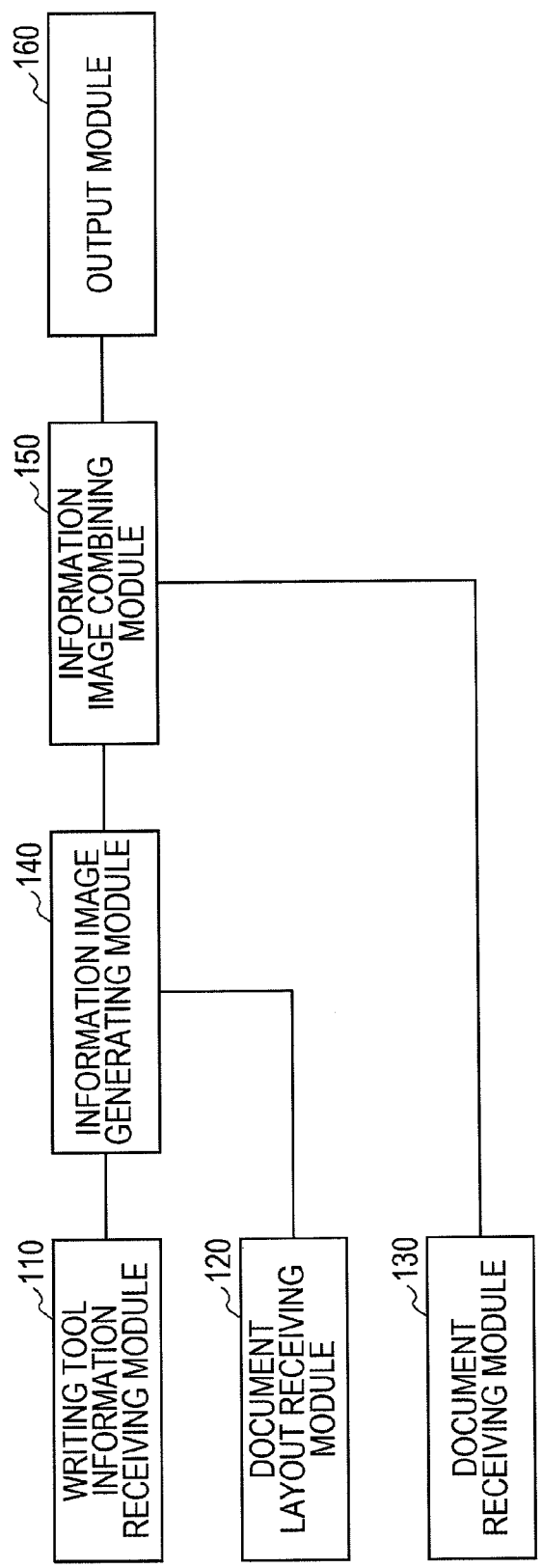
FIG. 1 is a conceptual module configuration diagram illustrating an example configuration of an image output apparatus according to an exemplary embodiment of the present invention.

FIG. 1 is a conceptual module configuration diagram illustrating an example configuration of an image output apparatus according to the exemplary embodiment.

In general, "modules" are components of software (computer program) or hardware that may be logically separated from one another. Accordingly, the modules according to the exemplary embodiment correspond to not only modules in a computer program but also modules in a hardware configuration. Therefore, the description of the exemplary embodiment includes a description of a computer program for causing a computer to function as those modules (a program for causing a computer to execute individual program steps, a program for causing a computer to function as individual units, or a program for causing a computer to realize individual functions), a system, and a method. For the convenience of description, expressions "store", "cause . . . to store", and expressions equivalent thereto will be used. These expressions specifically mean "cause a storage device to store" or "perform control to cause a storage device to store" in the case of a computer program. The modules may correspond to functions in a one-to-one relationship. In terms of packaging, a single module may be constituted by a single program, plural modules may be constituted by a single program, or a single module may be constituted by plural programs. Also, plural modules may be executed by a single computer, or a single module may be executed by plural computers in a distributed or parallel environment. Alternatively, a single module may include another module. Hereinafter, "connection" is used to refer to a logical connection (transmission and reception of data, an instruction, a reference relationship between pieces of data, etc.), as well as a physical connection. "Predetermined" means being determined before a certain operation, and includes the meaning of being determined in accordance with a present situation/state or in accordance with a previous situation/state before a certain operation after processing according to the exemplary embodiment starts, as well as before processing according to the exemplary embodiment starts.

A system or apparatus may be realized by plural computers, hardware units, devices, or the like connected to one another via a communication medium, such as a network (including communication connections having a one-to-one correspondence), or may be realized by a single computer, hardware unit, device, or the like. "Apparatus" and "system" are used synonymously. Of course, "system" does not include a man-made social "organization" (social system).

Also, target information is read from a storage device in individual processing operations performed by respective modules or in individual processing operations performed by a single module. After each processing operation has ended, the processing result thereof is written into the storage device. Thus, a description of reading from the storage device before a processing operation and writing into the storage device after a process operation will be omitted. Here, examples of the storage device include a hard disk, a random access memory (RAM), an external storage medium, a storage device connected through a communication line, a register in a central processing unit (CPU), and the like.

The image processing apparatus (image output apparatus) according to the exemplary embodiment combines an information image with a document and outputs a resulting object. As illustrated in FIG. 1, the image output apparatus includes a writing tool information receiving module 110, a document layout receiving module 120, a document receiving module 130, an information image generating module 140, an information image combining module 150, and an output module 160.

The information image is an image code that is systematically created for representing electronic data in a machine readable manner. A specific example thereof will be described below with reference to FIGS. 9A to 9C.

The document receiving module 130 is connected to the information image combining module 150. The document receiving module 130 receives a document to be combined with an information image, and supplies the document to the information image combining module 150. Here, the document includes text data, electronic data of figures and images in some cases, or a combination of text data and electronic data. The document is a target of outputting (e.g., printing), storing, editing, searching, and so forth, may be transmitted/received as an independent unit between systems or users, and includes equivalents thereof. Examples of receiving a document include receiving an electronic document created using a document creating application, reading an image using a scanner, camera, or the like, receiving an image using a facsimile machine or the like from an external device via a communication line, and reading an electronic document stored in a hard disk or the like (including a hard disk incorporated into the image processing apparatus and a hard disk connected to the image processing apparatus via a network). An image of the document may either be a binary image or a multilevel image (including a color image). The number of pages of received images may either be one or plural. Here, the content of an image includes an input field in which information is to be manually written by a user, such as an examination form or an application form. Typically, the input field is a rectangular region defined by a line. Alternatively, the input field may be a region defined by parentheses, or may be a blank region without a definite partition. The blank region may be a blank region having a predetermined area or more, or may be an entire page or an entire document formed of plural pages. The information input to the input field may be characters, symbols such as a tick, figures, or the like as long as the information is written using a digital pen (writing tool) described below.

The document layout receiving module 120 is connected to the information image generating module 140. The document layout receiving module 120 receives information about the layout of a document received by the document receiving module 130, and supplies the layout information to the information image generating module 140. Here, the layout information includes at least information representing the position and size of an input field. Alternatively, the layout information may include information representing the positions and sizes of document components (title, paragraph, figure, table, etc.) other than the input field.

The writing tool information receiving module 110 is connected to the information image generating module 140. The writing tool information receiving module 110 receives writing tool information, which is information about a writing tool for an input field in a document.

Here, the writing tool information (writing tool information embedded in an information image) may be information about a digital pen (described below) used for inputting information to an input field in a document. The details of the writing tool information are as follows.

(1) The writing tool information may be authority information, which is information representing the authority (position, role, etc.) of using the digital pen. More specifically, the authority information is information representing a person in charge, a supervisor, an accountant, an accounting supervisor, etc.

(2) The writing tool information may be job title information, which is information representing a job title of using the digital pen. More specifically, the job title information is information representing a manager, a group leader, a team leader, a regular employee, etc.

(3) The writing tool information may be owner information, which is information representing an owner who uses the digital pen. More specifically, the owner information is information representing an employee identification (ID), etc.

(4) The writing tool information may be attribute information, which is information representing an attribute of the digital pen. More specifically, the attribute information is information representing the color of ink of the digital pen.

(5) The writing tool information may be writing tool identification information, which is information enabling the identification of the digital pen. More specifically, the writing tool identification information is information representing a serial number or the like enabling the unique identification of the digital pen.

Also, the writing tool information may be a combination of these pieces of information (a combination using a logical operator, such as AND, OR, NOT, etc.)

For example, if a document received by the document receiving module 130 has a field A to be used by a person in charge and a field B to be used by a supervisor, the writing tool information receiving module 110 will receive writing tool information representing the person in charge in the field A of the document, and will receive writing tool information representing the supervisor in the field B of the document. Also, an information image including the writing tool information representing the person in charge is combined with the field A of the document to be output to a medium by the output module 160. An information image including the writing tool information representing the supervisor is combined with the field B.

As for specification of writing tool information, specification using a mouse, keyboard, touch panel, or the like of a user may be received. Alternatively, writing tool information that is predetermined in each field may be received.

The information image generating module 140 is connected to the writing tool information receiving module 110, the document layout receiving module 120, and the information image combining module 150. The information image generating module 140 generates an information image, which is an image representing information, on the basis of position information representing a position in the document received by the document receiving module 130 and the writing tool information received by the writing tool information receiving module 110. The information image generating module 140 generates an information image to be combined into an input field using the layout information received by the document layout receiving module 120 (specifically, information representing the position and size of the input field) and the writing tool information. The foregoing "on the basis of" means embedding information including at least the position information and writing tool information in an information image so that the position information and writing tool information may be read when the information image is analyzed. The position information embedded in the information image is information that enables, when the information image embedded with the position information thereof is read by a digital pen, the trail of the digital pen to be reproduced. For example, XY coordinates or the like in the document correspond to the position information. Specifically, a set of XY coordinates in the document representing a region determined by the position and size of the input field corresponds to the position information.

Also, the information image generating module 140 may generate an information image on the basis of document information representing a document. A document ID, a page ID, etc. correspond to the document information. The document ID and the page ID will be described below with reference to FIG. 3.

The information image combining module 150 is connected to the document receiving module 130, the information image generating module 140, and the output module 160. The information image combining module 150 combines an information image generated by the information image generating module 140 with an input field in the document received by the document receiving module 130. Of course, the information image may be combined with a region other than the input field. The information image to be combined with a region other than the input field does not include writing tool information. As described above, there is a possibility that an entire page or an entire document is used as the input field. In that case, an information image including writing tool information is combined with the entire page or the entire document.

The output module 160 is connected to the information image combining module 150. The output module 160 outputs, to a medium, a document with which an information image is combined by the information image combining module 150. Examples of outputting a document include printing an image using a printing apparatus such as a printer, transmitting an image using an image transmitting apparatus such as a facsimile machine, and the like. Also, examples of outputting a document include displaying an image on a display apparatus such as a display, writing an image into an image storage apparatus such as an image database, storing an image in a storage medium such as a memory card, and supplying an image to another information processing apparatus. That is, the document is finally output onto a paper or plastic medium so that writing may be performed thereon using a digital pen.

Figure 2:
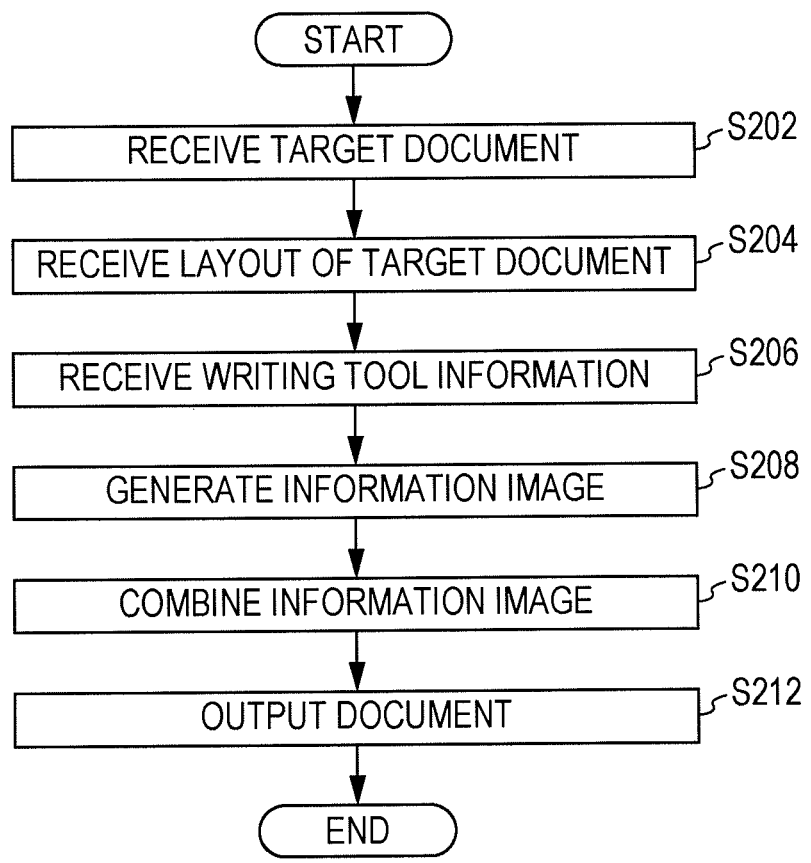
FIG. 2 is a flowchart illustrating an example of processing performed by the image output apparatus according to the exemplary embodiment.

FIG. 2 is a flowchart illustrating an example of processing performed by the image output apparatus according to the exemplary embodiment.

In step S202, the document receiving module 130 receives a target document.

In step S204, the document layout receiving module 120 receives the layout of the target document (at least the position and size of an input field).

In step S206, the writing tool information receiving module 110 receives writing tool information about a writing tool suitable for the input field in the target document.

In step S208, the information image generating module 140 generates an information image including the position of the input field and the writing tool information.

In step S210, the information image combining module 150 combines the information image with the input field in the target document.

In step S212, the output module 160 outputs the document with which the information image is combined onto a medium.

FIG. 3 is an explanatory diagram illustrating an example system configuration for realizing the exemplary embodiment. This system includes a document-creating information processing apparatus 310, a document database (DB) 320, an information-image-generating image processing apparatus 330, a digital pen 350, and a write-back information processing apparatus 360. In order to determine whether or not the digital pen 350 is suitable as a digital pen for performing writing at a reading position, the system may include at least the information-image-generating image processing apparatus 330 and the digital pen 350.

The following processing is performed in this system. That is, an information image including position information (coordinate information) is superimposed on an electronic document, and the electronic document is printed by the information-image-generating image processing apparatus 330. The printed document is read by the digital pen 350, which includes a compact camera, so that hand-written information is accumulated as stroke information in the digital pen 350. When the digital pen 350 is connected to the write-back information processing apparatus 360, such as a personal computer (PC), using a universal serial bus (USB) or the like, a stroke information extracting module 362 and a write-back module 364 in the write-back information processing apparatus 360 extract the stroke information from the digital pen 350, specify the original electronic document on the basis of a document ID, and write back the stroke information to the electronic document. Alternatively, the digital pen 350 may transmit the stroke information to the write-back information processing apparatus 360 through wireless communication.

The document-creating information processing apparatus 310 includes a document creating application 312 and a writing tool information specifying module 314, and is connected to the document DB 320 and the information-image-generating image processing apparatus 330.

The document creating application 312 is an application program for creating an electronic document and causing the information-image-generating image processing apparatus 330 to print a document-with-information-image 340, to which information is to be added by hand writing.

The writing tool information specifying module 314 specifies writing tool information, which is information about a digital pen for an input field. For example, the writing tool information specifying module 314 supplies an input field/writing tool information table 500 (see FIG. 5) to the information-image-generating image processing apparatus 330. Accordingly, the writing tool information receiving module 110 in the information-image-generating image processing apparatus 330 receives the input field/writing tool information table 500. FIG. 5 is an explanatory diagram illustrating an example data structure of the input field/writing tool information table 500. The input field/writing tool information table 500 includes an input field ID column 510 and a writing tool information column 520. The input field ID column 510 stores input field IDs, which serve as information for uniquely identifying input fields in the system illustrated in FIG. 3. The writing tool information column 520 stores information about digital pens suitable for writing in respective input fields.

Alternatively, the writing tool information specifying module 314 may supply a document/page/writing tool information table 600 (see FIG. 6) to the information-image-generating image processing apparatus 330, instead of the input field/writing tool information table 500. In this case, an entire page serves as an input field, and a digital pen suitable for performing writing on the entire page is specified. Accordingly, the writing tool information receiving module 110 in the information-image-generating image processing apparatus 330 receives the document/page/writing tool information table 600. FIG. 6 is an explanatory diagram illustrating an example data structure of the document/page/writing tool information table 600. The document/page/writing tool information table 600 includes a document ID column 610, a page ID column 620, and a writing tool information column 630. The document ID column 610 stores document IDs, which serve as information for uniquely identifying documents in the system illustrated in FIG. 3. The page ID column 620 stores page IDs, which serve as information for uniquely identifying pages in the respective documents. The writing tool information column 630 stores information about digital pens suitable for performing writing on the respective pages.

Alternatively, the writing tool information specifying module 314 may supply a document/writing tool information table 700 (see FIG. 7) to the information-image-generating image processing apparatus 330, instead of the input field/writing tool information table 500. In this case, an entire document (if there are plural pages, all the plural pages) serves as an input field, and a digital pen suitable for performing writing on the entire document is specified. Accordingly, the writing tool information receiving module 110 in the information-image-generating image processing apparatus 330 receives the document/writing tool information table 700. FIG. 7 is an explanatory diagram illustrating an example data structure of the document/writing tool information table 700. The document/writing tool information table 700 includes a document ID column 710 and a writing tool information column 720. The document ID column 710 stores document IDs, which serve as information for uniquely identifying documents in the system illustrated in FIG. 3. The writing tool information column 720 stores information about digital pens suitable for performing writing on the respective documents.

At the time of printing a document, the document creating application 312 specifies the name of the apparatus that performs printing (the name of a printer, i.e., the name of the information-image-generating image processing apparatus 330), generates a document image, supplies the document ID and the writing tool information specified by the writing tool information specifying module 314 to the information-image-generating image processing apparatus 330, and provides an print instruction. In an information image printed accordingly, writing tool information is embedded in each input field. Then, the document creating application 312 causes the document DB 320 to store the created electronic document. Also, the document creating application 312 supplies information about the layout of input fields of the target document (for example, a document layout table 800 illustrated in FIG. 8) to the information-image-generating image processing apparatus 330. Accordingly, the document layout receiving module 120 in the information-image-generating image processing apparatus 330 receives the information about the layout. FIG. 8 is an explanatory diagram illustrating an example data structure of the document layout table 800. The document layout table 800 includes an input field ID column 810, a position column 820, a height column 830, and a width column 840. The input field ID column 810 stores input field IDs. The position column 820 stores the upper-left-corner positions of the respective input fields, for example. The height column 830 stores the heights of the respective input fields. The width column 840 stores the widths of the respective input fields.

The document DB 320 is connected to the document-creating information processing apparatus 310 and the write-back information processing apparatus 360. The document DB 320 stores an electronic document created by the document creating application 312. The write-back module 364 combines writing information related to the digital pen 350 with the stored electronic document.

The information-image-generating image processing apparatus 330 is connected to the document-creating information processing apparatus 310, corresponds to the image processing apparatus (image output apparatus) illustrated in FIG. 1, prints an electronic document created by the document-creating information processing apparatus 310, and outputs the document-with-information-image 340 obtained by combining an information image. The document-with-information-image 340 is a paper document that is generated by printing an electronic document, and is a paper document on which position information is superimposed as an information image. Also, a document ID and so forth may be embedded in the information image.

Now, an example of an electronic document 410 and the document-with-information-image 340 will be described with reference to FIGS. 4A and 4B.

Figure 4A:
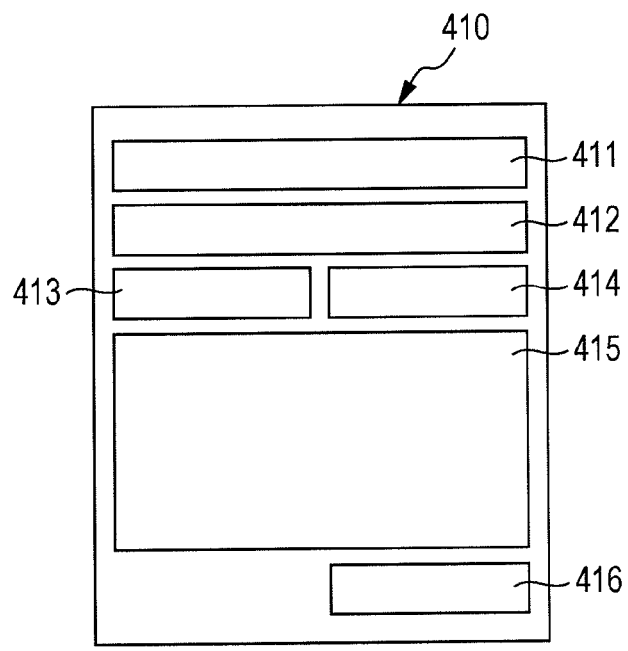
FIGS. 4A and 4B are explanatory diagrams illustrating an example of an electronic document and a document-with-information-image.

The electronic document 410 illustrated in FIG. 4A is a document created by the document creating application 312 and is stored in the document DB 320. For example, assume that the electronic document 410 has six input fields and that writing tool information about a digital pen suitable for writing is specified in each of the input fields.

Figure 4B:
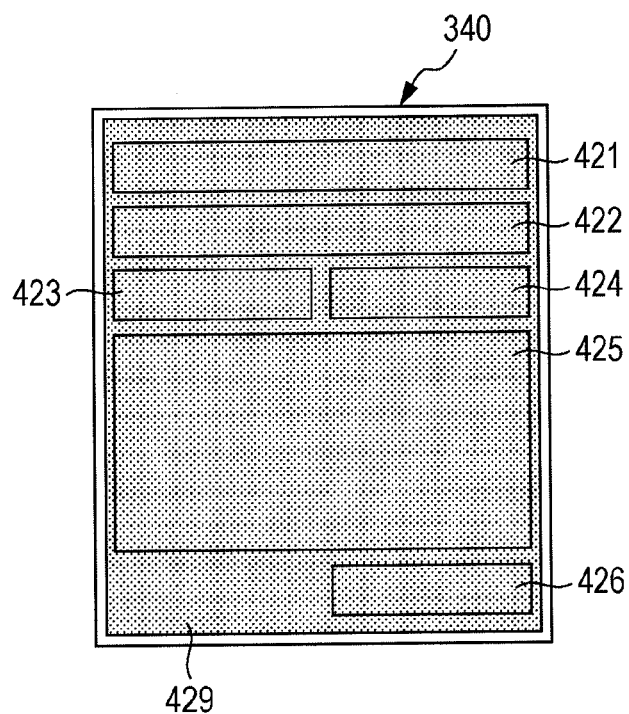

The document-with-information-image 340 illustrated in FIG. 4B is a paper document obtained through printing performed by the information-image-generating image processing apparatus 330, and writing is performed thereon by a user who operates the digital pen 350. An information image embedded with position information and writing tool information is combined into each of an input field 421, an input field 422, an input field 423, an input field 424, an input field 425, and an input field 426 of the document-with-information-image 340. Also, an information image embedded with position information is combined with a background 429. Alternatively, an information image may not be combined with the background 429.

Figure 9A:
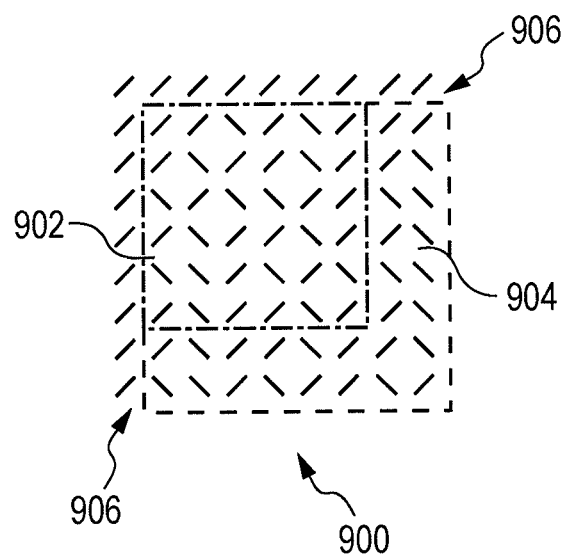
FIGS. 9A to 9C are explanatory diagrams illustrating an example of an information image.
Figure 9B:
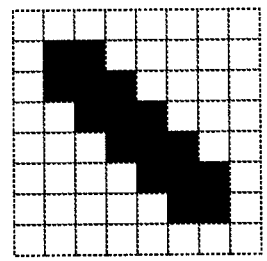
Figure 9C:
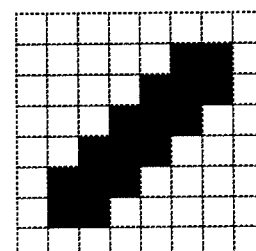

FIGS. 9A to 9C are explanatory diagrams illustrating an example of an information image.

This example is a two-dimensional code pattern image in which glyph code is used as a code symbol serving as an information image (for example, Japanese Unexamined Patent Application Publication Nos. 6-103390 and 6-75795). The glyph code represents data using sloping lines of different angles, and has been developed by Palo Alto Research Center of Xerox Corporation in the United States.

In this example, a unit region 900 is a square region formed of eight symbols×eight symbols. The values of individual symbols are expressed by sloping line patterns, as illustrated in FIGS. 9B and 9C. In this example, a symbol value of zero is expressed by a downward sloping line that forms an angle of 45 degrees counterclockwise with respect to a vertical line (pattern 0 in FIG. 9B). A symbol value of one is expressed by an upward sloping line that forms an angle of 45 degrees clockwise with respect to the vertical line (pattern 1 in FIG. 9C).

A position code image 902 is a square image formed of six symbols×six symbols at the upper left corner of the unit region 900. An identification code image 904 is a reverse-L-shaped region, which is a region obtained by subtracting the position code image 902 from the unit region 900.

In this example, a column and a row of a synchronization code 906 are provided in vertical and horizontal directions along the periphery of the unit region 900. In this example, the synchronization code 906 is a sequence of upward sloping line symbols ("1"). The size and alignment pitch of the symbols are the same as those in the unit region 900. The synchronization code 906 is provided in the vertical and horizontal directions at regular intervals, and each unit region 900 is provided in the square region surrounded by the synchronization code 906. The synchronization code 906 serves as a partition of unit regions 900. That is, in an apparatus that has read a two-dimensional code pattern image, if rows and columns of sequential upward sloping line symbols are detected, inner regions of a grid pattern formed of the rows and columns may be recognized as unit regions 900. Also, the six×six symbols at the upper-left corner of each of the unit regions 900 may be recognized as the position code image 902.

The synchronization code 906 is not necessarily be that illustrated in FIG. 9A as long as it specifies the position of the unit region 900 or the position code image 902. For example, a symbol in a specific shape different from the sloping line symbol may be placed at the four corners of the unit region 900, thereby forming the synchronization code 906. In the example illustrated in FIG. 9A, a row and a column having a width corresponding to one symbol are used for the synchronization code 906. However, if marks forming the synchronization code 906 are sufficiently small, unit regions 900 may be two-dimensionally arranged without gaps therebetween, and the marks may be arranged in the margin of the unit regions 900 adjacent to each other.

In the example illustrated in FIG. 9A, 36 symbols in total, that is, data of 36 bits, is stored in one position code image 902. Among the 36 bits, 18 bits may be used for encoding an x coordinate, and the other 18 bits may be used for encoding a y coordinate. If each group of 18 bits is used for encoding positions, 2^18 types of (about 260,000 types of) positions may be encoded. Assume that each sloping line pattern is constituted by eight pixels×eight pixels, as illustrated in FIGS. 9B and 9C, and that printing is performed at 600 dpi. In this case, the length of one dot is 0.0423 mm in the vertical and horizontal directions, and thus the length of the two-dimensional code illustrated in FIG. 9A (including the synchronization code 906) is about 3 mm (=eight pixels per symbol×nine symbols×0.0423 mm) in both the vertical and horizontal directions. If 260,000 types of positions are encoded at the intervals of 3 mm, a length of about 786 m may be encoded. If the reading accuracy is high, all the 18 bits may be used for encoding positions. However, if a reading error becomes a problem, it is appropriate to add redundant bits for error detection and error correction. The performance of error detection and error correction may be enhanced by increasing the ratio of redundant bits to 18 bits, but the range of positions that may be expressed decreases.

In the example illustrated in FIG. 9A, the identification code image 904 is formed of a rectangular region of two bits×eight bits and a rectangular region of two bits×six bits, so that identification information or the like of 28 bits in total may be stored therein. If 28 bits are used for identification information or the like, about 270,000,000 types of (2^28 types of) identification information or the like may be expressed. Alternatively, some of the 28 bits may be used as redundant bits for error detection and error correction so as to handle a read error. In this exemplary embodiment, the identification information includes at least writing tool information, and may also include a document ID and a page ID. For example, the identification information may include a sheet identification number that uniquely identifies a sheet. The identification code images 904 in the unit regions 900 printed in input fields of one sheet are the same. Of course, the position code images 902 in the individual unit regions 900 are different from one another because the position information represented by the position code images 902 in the unit regions 900 is information representing positions in the sheet.

In the above-described example, two sloping line patterns having angles different from each other by 90 degrees are used as symbols, thereby expressing one-bit data by one symbol. This is merely an example. For example, if a pattern of a vertical line and a horizontal line is added to a symbol, two-bit information may be expressed by one symbol. In this way, the number of bits expressing one symbol may be increased by increasing the types of angle of a sloping line pattern of one symbol. Also, a code other than the glyph code may be used as an information image.

The digital pen 350 (also called a scanner-equipped pen or an electronic pen) reads an information image when the user performs writing on the document-with-information-image 340 using the digital pen 350, extracts a trail the writing as stroke information, and transmits the stroke information to the write-back information processing apparatus 360. Then, the digital pen 350 determines whether or not input to an input field is being performed with the digital pen 350 that is appropriate, and outputs a warning if not appropriate. The configuration of the digital pen 350 and the processing performed thereby will be described below with reference to FIG. 10 and so forth. Here, the stroke information is information that is represented as a series of coordinates obtained by performing writing on the document-with-information-image 340 using the digital pen 350.

The write-back information processing apparatus 360 includes the stroke information extracting module 362 and the write-back module 364, and is connected to the document DB 320 and the digital pen 350.

The stroke information extracting module 362 has a function of obtaining, from the digital pen 350, stroke information about a stroke made on the document-with-information-image 340. The stroke information includes the document ID of the document-with-information-image 340 on which the stroke has been made, a page number, a stroke sequence (sequence of position information), etc.

The document ID is information for uniquely identifying a document in the system illustrated in FIG. 3, as described above. An electronic document and a paper document obtained by printing the electronic document have the same document ID. The document ID is necessary for identifying the paper document serving as a target of hand writing and for specifying the original electronic document corresponding thereto. However, the document ID is not necessary for determining whether or not the digital pen 350 is suitable for performing writing in an input field. Something other than the document ID may be used as long as the correspondence between an electronic document and a paper document is specified.

The write-back module 364 is an application program for writing back, to an original electronic document, stroke information about a stroke made on the document-with-information-image 340 using the digital pen 350. The write-back module 364 performs processing of reflecting the stroke information received from the stroke information extracting module 362 as stroke information on the electronic document on the basis of information about a document ID and a page ID.

Figure 10:
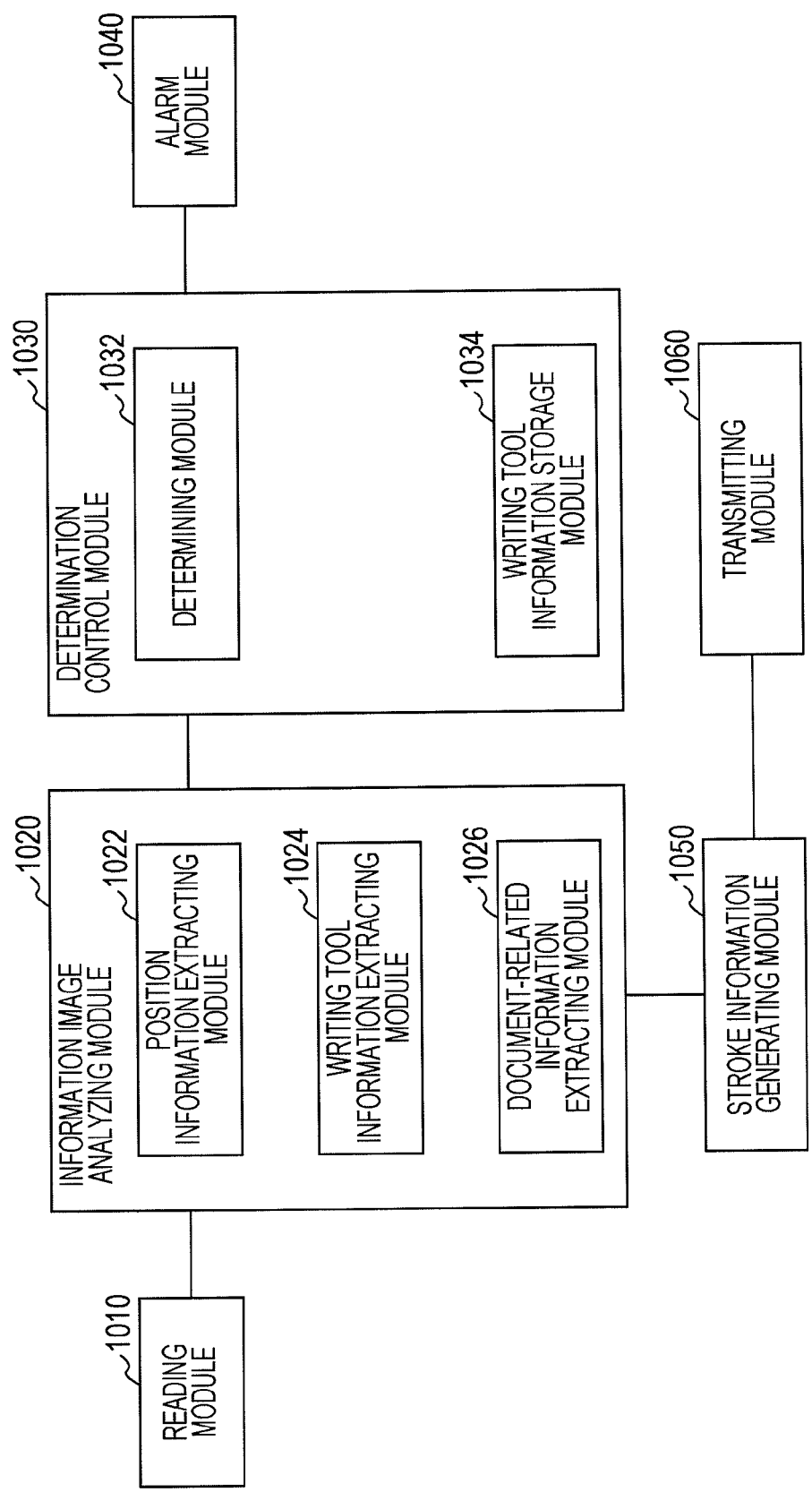
FIG. 10 is a conceptual module configuration diagram illustrating an example configuration of an image reading apparatus according to the exemplary embodiment.

FIG. 10 is a conceptual module configuration diagram illustrating an example configuration of an image reading apparatus according to the exemplary embodiment. The image processing apparatus (image reading apparatus) according to the exemplary embodiment reads a document combined with an information image, and includes a reading module 1010, an information image analyzing module 1020, a determination control module 1030, an alarm module 1040, a stroke information generating module 1050, and a transmitting module 1060, as illustrated in FIG. 10. These modules are accommodated in the digital pen 350 illustrated in FIG. 3.

The reading module 1010 is connected to the information image analyzing module 1020. The reading module 1010 reads an information image that has been output onto a medium such as paper and that is used for extracting a writing position of a writing tool. Here, the medium such as paper is a document combined with an information image that is generated on the basis of writing tool information in an input field of the document and position information representing a position in the document. In the above-described example, the reading module 1010 reads an image at a writing position on the document-with-information-image 340. The reading module 1010 corresponds to an image reading module 1252 illustrated in FIG. 12 described below.

Additionally, the information image read by the reading module 1010 may further include document information representing a document.

The information image analyzing module 1020 includes a position information extracting module 1022, a writing tool information extracting module 1024, and a document-related information extracting module 1026, and is connected to the reading module 1010, the determination control module 1030, and the stroke information generating module 1050.

The position information extracting module 1022 analyzes the information image read by the reading module 1010 and extracts position information. That is, the position information extracting module 1022 extracts position information representing a writing position, so that stroke information serving as writing information may be generated using the position information.

The writing tool information extracting module 1024 analyzes the information image read by the reading module 1010 and extracts writing tool information from identification information or the like in the information image.

The document-related information extracting module 1026 analyzes the information image read by the reading module 1010 and extracts information related to the document from identification information or the like in the information image. Examples of the information related to the document include a document ID serving as document information.

The determination control module 1030 includes a determining module 1032 and a writing tool information storage module 1034, and is connected to the information image analyzing module 1020 and the alarm module 1040.

The writing tool information storage module 1034 stores writing tool information representing the digital pen (the image reading apparatus according to the exemplary embodiment illustrated in FIG. 10). Since the digital pen does not store the document ID of a document on which writing may be performed using the digital pen, it is not necessary to set, every time a document is generated, the document ID thereof in the digital pen.

Here, the writing tool information may be information about the digital pen, and is stored in advance in the writing tool information storage module 1034. The details of the writing tool information are as follows.

(1) The writing tool information may be authority information, which is information representing the authority (position, role, etc.) of using the digital pen. More specifically, the authority information is information representing a person in charge, a supervisor, an accountant, an accounting supervisor, etc.

(2) The writing tool information may be job title information, which is information representing a job title of using the digital pen. More specifically, the job title information is information representing a manager, a group leader, a team leader, a regular employee, etc.

(3) The writing tool information may be owner information, which is information representing an owner who uses the digital pen. More specifically, the owner information is information representing an employee identification (ID), etc.

(4) The writing tool information may be attribute information, which is information representing an attribute of the digital pen. More specifically, the attribute information is information representing the color of ink of the digital pen. If the digital pen has inks of plural colors, the writing tool information in the writing tool information storage module 1034 may be changed in accordance with an operation of selecting ink. For example, if a red ink is selected, the selection is detected, and writing tool information representing a red ink is stored in the writing tool information storage module 1034.

(5) The writing tool information may be writing tool identification information, which is information enabling the identification of the digital pen. More specifically, the writing tool identification information is information representing a serial number or the like enabling the unique identification of the digital pen.

Specifically, the writing tool information storage module 1034 stores a writing tool information table 1400. FIG. 14 is an explanatory diagram illustrating an example data structure of the writing tool information table 1400. The writing tool information table 1400 includes a writing tool information column 1410. The writing tool information column 1410 stores writing tool information.

The writing tool information stored in the writing tool information storage module 1034 may include plural pieces of writing tool information.

The determining module 1032 compares the writing tool information extracted by the writing tool information extracting module 1024 with the writing tool information stored in the writing tool information storage module 1034, thereby determining whether or not the digital pen is suitable as a digital pen for performing writing at the position where reading has been performed by the reading module 1010.

At the determination, for example, if the writing tool information extracted by the writing tool information extracting module 1024 matches the writing tool information stored in the writing tool information storage module 1034, the determining module 1032 may determine that the digital pen is suitable as a digital pen for performing writing at the position (the position of the image read in the input field ID column 810, that is, the position at which writing is to be performed), that is, the position is suitable as a writing position of the digital pen. If both the pieces of writing tool information do not match, the determining module 1032 may determine that the digital pen is not suitable as a writing tool for performing writing at the position.

The determination processing is not limited to determination of whether or not the pieces of writing tool information match. For example, writing tool information may have a hierarchical structure, and whether or not the digital pen is suitable as a digital pen for performing writing at the position may be determined using the upper-lower relationship in the hierarchical structure. For example, if job title information is used as writing tool information, the hierarchical structure of job titles is used. That is, if the writing tool information extracted by the writing tool information extracting module 1024 is in a lower layer than or at the same layer as the writing tool information stored in the writing tool information storage module 1034, the determining module 1032 may determine that the digital pen is suitable as a writing tool for performing writing at the position. That is, a person having an upper job title is capable of performing writing that is to be performed by a person having a lower job title. If the writing tool information extracted by the writing tool information extracting module 1024 is in an upper layer than the writing tool information stored in the writing tool information storage module 1034, the determining module 1032 may determine that the digital pen is not suitable as a writing tool for performing writing at the position. That is, a person having a lower job title is incapable of performing writing that is to be performed by a person having an upper job title.

Figure 16:
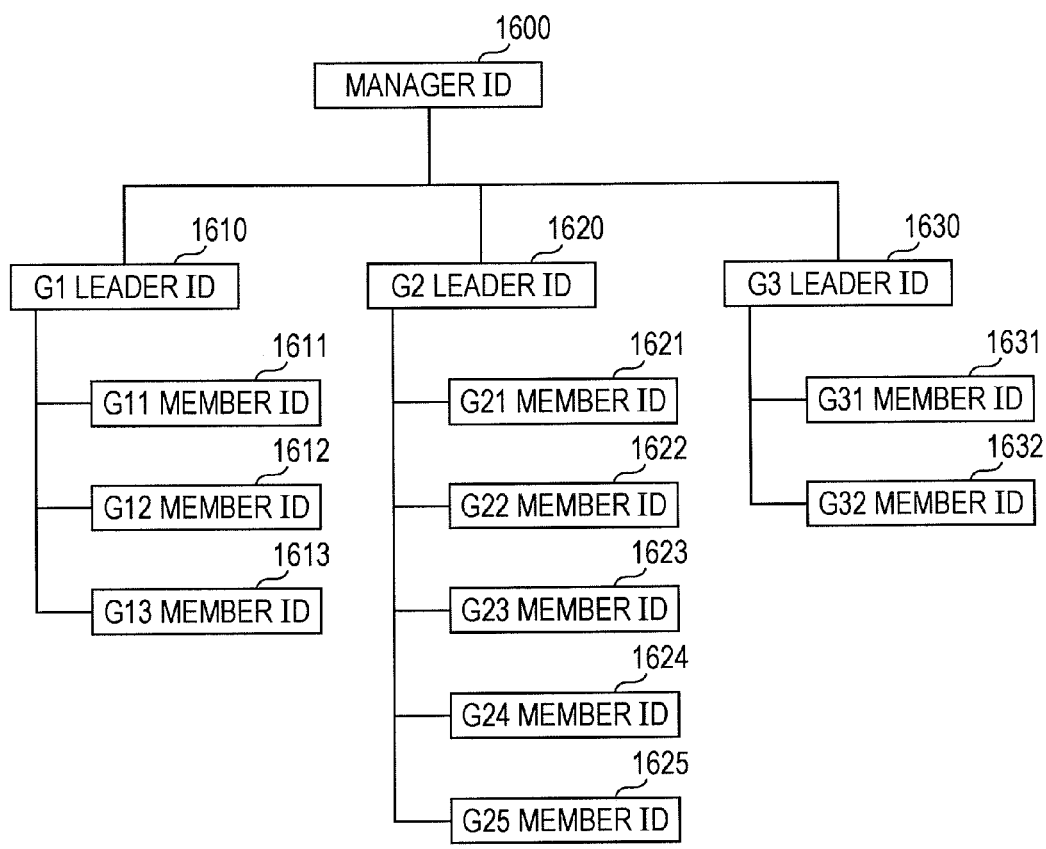
FIG. 16 is an explanatory diagram illustrating an example of a hierarchical structure of job titles.

FIG. 16 is an explanatory diagram illustrating an example of a hierarchical structure of job titles. In the example in FIG. 16, there are a G1 leader ID 1610, a G2 leader ID 1620, and a G3 leader ID 1630 in the lower layer of a manager ID 1600. In the lower layer of the G1 leader ID 1610, there are a G11 member ID 1611, a G12 member ID 1612, and a G13 member ID 1613. In the lower layer of the G2 leader ID 1620, there are a G21 member ID 1621, a G22 member ID 1622, a G23 member ID 1623, a G24 member ID 1624, and a G25 member ID 1625. In the lower layer of the G3 leader ID 1630, there are a G31 member ID 1631 and a G32 member ID 1632. The hierarchical structure of such job titles is stored in the writing tool information storage module 1034, so that the hierarchical structure may be used for determining whether or not the digital pen is suitable as a writing tool. For example, in a case where the writing tool information stored in the writing tool information storage module 1034 is the G2 leader ID 1620 and where the writing tool information extracted by the writing tool information extracting module 1024 is the G25 member ID 1625, it is determined that the digital pen is suitable as a writing tool for performing writing at the position. In a case where the writing tool information extracted by the writing tool information extracting module 1024 is the manager ID 1600, it is determined that the digital pen is not suitable as a writing tool for performing writing at the position. Also, information about a difference in job title in the hierarchical structure of job titles may be used as part of writing tool information so as to determine whether or not the digital pen is suitable as a writing tool. The hierarchical structure illustrated in FIG. 16 has a three-layer structure in which the manager is positioned in the first layer, the G1 leader to G3 leader are positioned in the second layer, and the individual G members under the respective G leaders are positioned in the third layer. Here, the first layer may be represented by A, the second layer may be represented by B, and the third layer may be represented by C, and the connection among them may be used as writing tool information. In this case, the ID of the manager is "A", the ID of each G leader is "A-B", and the ID of each G member is "A-B-C". By using such IDs representing information about the hierarchical structure, the upper-lower relationship in the hierarchical structure of writing tool information is clarified, so that it may be determined whether or not the digital pen is suitable as a writing tool. As the foregoing A, B, and C, the IDs of the respective users may be used.

The alarm module 1040 is connected to the determination control module 1030, and outputs a warning if the determining module 1032 determines that the digital pen is not suitable as a digital pen for performing writing at the position where reading has been performed by the reading module 1010. For example, the alarm module 1040 may include a speaker, a light source, a vibration device, or the like. The mode of a warning to be output may be sound (warning sound, voice message, etc.), light (blinking of a light source, output of a predetermined color, etc.), or vibration.

The determining module 1032 makes a determination and the alarm module 1040 outputs a warning regardless of whether or not writing is actually being performed. If the reading module 1010 reads an information image before writing is performed, a warning may be output before writing is performed. If the reading module 1010 reads an information image while writing is being performed, a warning may be output while writing is being performed.

A warning may be continuously output until a predetermined time has elapsed after start of the output, until the determining module 1032 determines that the digital pen is suitable as a digital pen for performing writing at the position where reading has been performed by the reading module 1010, or until an operator performs an operation of forcibly stopping the warning.

Also, the alarm module 1040 may perform control so that writing is not performed by the digital pen if the determining module 1032 determines that the digital pen is not suitable as a digital pen for performing writing at the position where reading has been performed by the reading module 1010. For example, the alarm module 1040 may have a mechanism of accommodating the tip of the digital pen, and may perform control to accommodate the tip so that writing is not performed if it is determined that the digital pen is not suitable. In a case where an inkjet scheme is employed as the writing mechanism of the digital pen and where it is determined that the digital pen is not suitable, the alarm module 1040 may perform control to stop ejection of ink so that writing is not performed.

Also, if the determining module 1032 determines that the digital pen is not suitable as a digital pen for performing writing at the position where reading has been performed by the reading module 1010, the alarm module 1040 may perform control so that the position information extracted by the position information extracting module 1022 is not output to the transmitting module 1060. For example, in order to perform control so as not to output position information to the transmitting module 1060, the alarm module 1040 may cause the position information extracting module 1022 not to extract position information, may cause the position information extracted by the position information extracting module 1022 not to be stored, may cause the stroke information generating module 1050 not to generate stroke information, or may cause the transmitting module 1060 not to perform transmission.

Also, the alarm module 1040 may combine any two or more of warning, control to prevent writing using the digital pen, and control to prevent output of position information.

The stroke information generating module 1050 is connected to the information image analyzing module 1020 and the transmitting module 1060. The stroke information generating module 1050 generates stroke information on the basis of the position information extracted by the position information extracting module 1022 and the document-related information extracted by the document-related information extracting module 1026. For example, the stroke information generating module 1050 may generate a stroke information table 1300. FIG. 13 is an explanatory diagram illustrating an example data structure of the stroke information table 1300. The stroke information table 1300 includes a document ID column 1310, an X coordinate column 1320, and a Y coordinate column 1330. The document ID column 1310 stores document IDs, which serve as document-related information extracted by the document-related information extracting module 1026. The X coordinate column 1320 and the Y coordinate column 1330 store X coordinates and Y coordinates, which serve as position information extracted by the position information extracting module 1022.

The transmitting module 1060 is connected to the stroke information generating module 1050. The transmitting module 1060 transmits the stroke information generated by the stroke information generating module 1050 to the foregoing write-back information processing apparatus 360. Alternatively, the generated stroke information may be accumulated in a stroke information storage module (not illustrated). Then, when the image reading apparatus (digital pen 350) is connected to the write-back information processing apparatus 360, the transmitting module 1060 may transmit the stroke information accumulated in the stroke information storage module to the write-back information processing apparatus 360.

Figure 11:
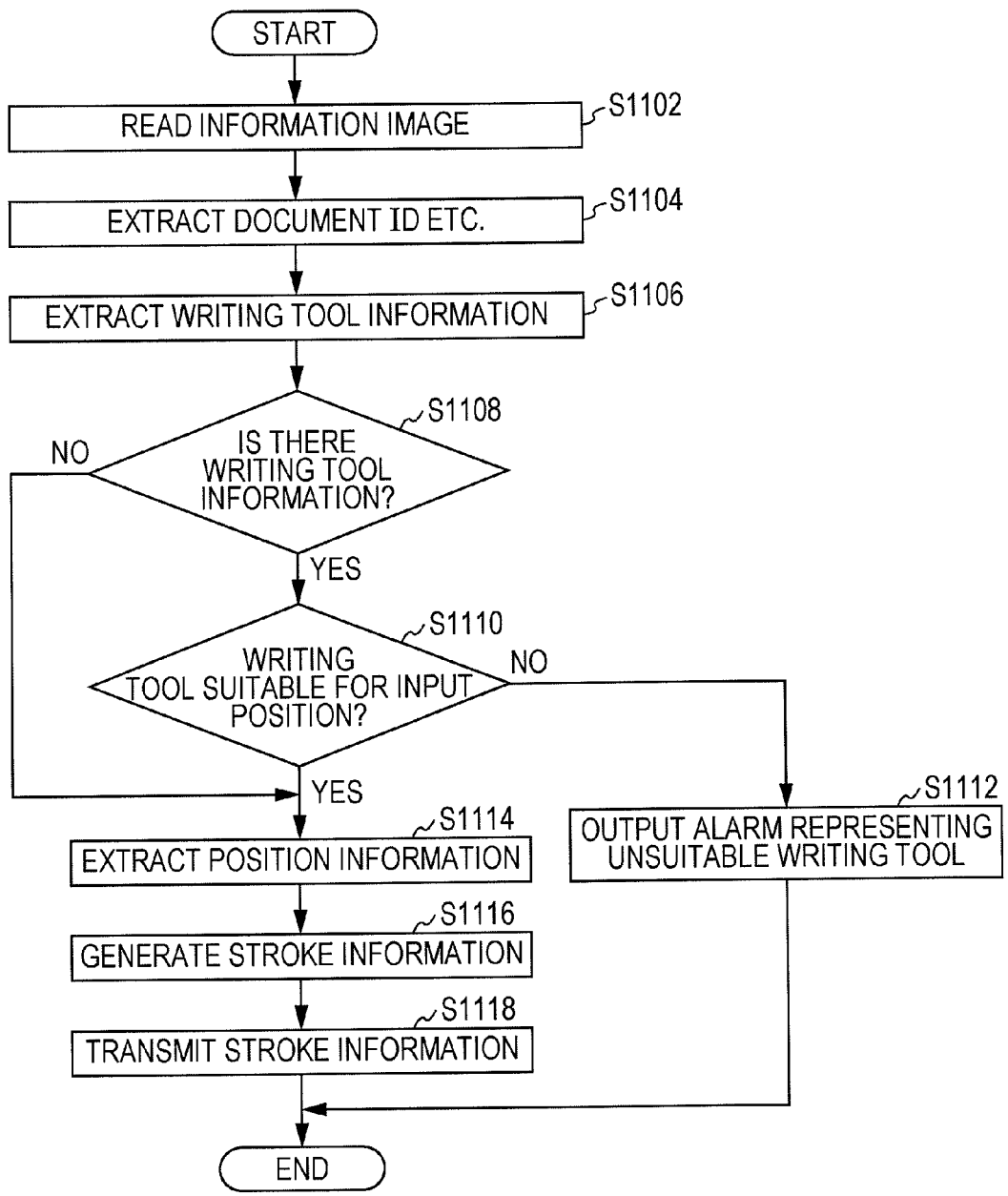
FIG. 11 is a flowchart illustrating an example of processing performed by the image reading apparatus according to the exemplary embodiment.

FIG. 11 is a flowchart illustrating an example of processing performed by the image reading apparatus according to the exemplary embodiment.

In step S1102, the reading module 1010 reads an information image printed on the document-with-information-image 340.

In step S1104, the document-related information extracting module 1026 extracts a document ID, etc. from the information image.

In step S1106, the writing tool information extracting module 1024 extracts writing tool information from the information image.

In step S1108, the determining module 1032 determines whether or not there is writing tool information. If there is writing tool information, the process proceeds to step S1110. Otherwise, the process proceeds to step S1114.

In step S1110, the determining module 1032 determines whether or not the digital pen is a writing tool suitable for the input position. If the digital pen is a suitable writing tool, the process proceeds to step S1114. Otherwise, the process proceeds to step S1112.

In step S1112, the alarm module 1040 outputs an alarm representing that the digital pen is not a suitable writing tool.

In step S1114, the position information extracting module 1022 extracts position information.

In step S1116, the stroke information generating module 1050 generates stroke information.

In step S1118, the transmitting module 1060 transmits the stroke information.

FIG. 12 is an explanatory diagram illustrating an example structure of the digital pen 350. The digital pen 350 includes an ink unit 1251, the image reading module 1252, and a control/transmission module 1253. The reading module 1010 illustrated in FIG. 10 is realized by the image reading module 1252. The information image analyzing module 1020, the determination control module 1030, the alarm module 1040, the stroke information generating module 1050, and the transmitting module 1060 are realized by the control/transmission module 1253.

In accordance with an operation performed by the operator of the digital pen 350, characters or the like are written on the document-with-information-image 340 using the ink unit 1251. Then, the image reading module 1252 performs continuous image capturing at a relatively high speed of about several tens to hundred and several tens of frames per second, scans individual frames, and outputs a read image to the control/transmission module 1253. The control/transmission module 1253 detects the synchronization code 906 from the image read by the image reading module 1252. In the case of an image having the code pattern illustrated in FIGS. 9A to 9C, rows and columns of sequential upward sloping line patterns are detected as rows and columns of the synchronization code 906. As the synchronization code, various types of codes that have been suggested may be used as well as the code illustrated in FIG. 9A, and the synchronization code may be detected using a certain method in accordance with the type of the synchronization code.

The position code image 902 and the identification code image 904 are extracted from the read image. The control/transmission module 1253 performs code recognition processing on the position code image 902 and the identification code image 904, thereby reproducing position information and identification information. The code recognition processing performed here is, in brief, the reverse processing of information image generation processing. As for the identification code image 904, the control/transmission module 1253 first recognizes individual sloping line symbols in the identification code image 904, thereby obtaining the values of the respective symbols, and obtains an identification code matrix in which the values of the respective symbols are arranged in accordance with the arrangement positions of the respective symbols in the identification code image 904. Then, the control/transmission module 1253 obtains a serial identification code for the identification code matrix, and performs decoding processing on the identification code in accordance with the encoding method, thereby decoding the identification information. As for the position code image 902, position information may be decoded by performing processing equivalent to the foregoing processing. That is, the foregoing extraction and recognition processing is performed in units of frames, so that position information and identification information are obtained.

The position information and identification information obtained from the read image of each frame in this way are provided to the write-back information processing apparatus 360 that uses these pieces of information and are used therein. For example, in the case of the write-back information processing apparatus 360 that captures, as electronic information, the trail of a stroke made by an operator on a sheet having an information image printed thereon using the digital pen 350, the write-back information processing apparatus 360 specifies the sheet on the basis of the identification information to obtain the original document of the sheet, obtains the trail of a stroke made by the operator from the position information obtained from the individual frames that are sequentially read, and superimposes the image representing the trail on the original document to record the image.

Figure 15:
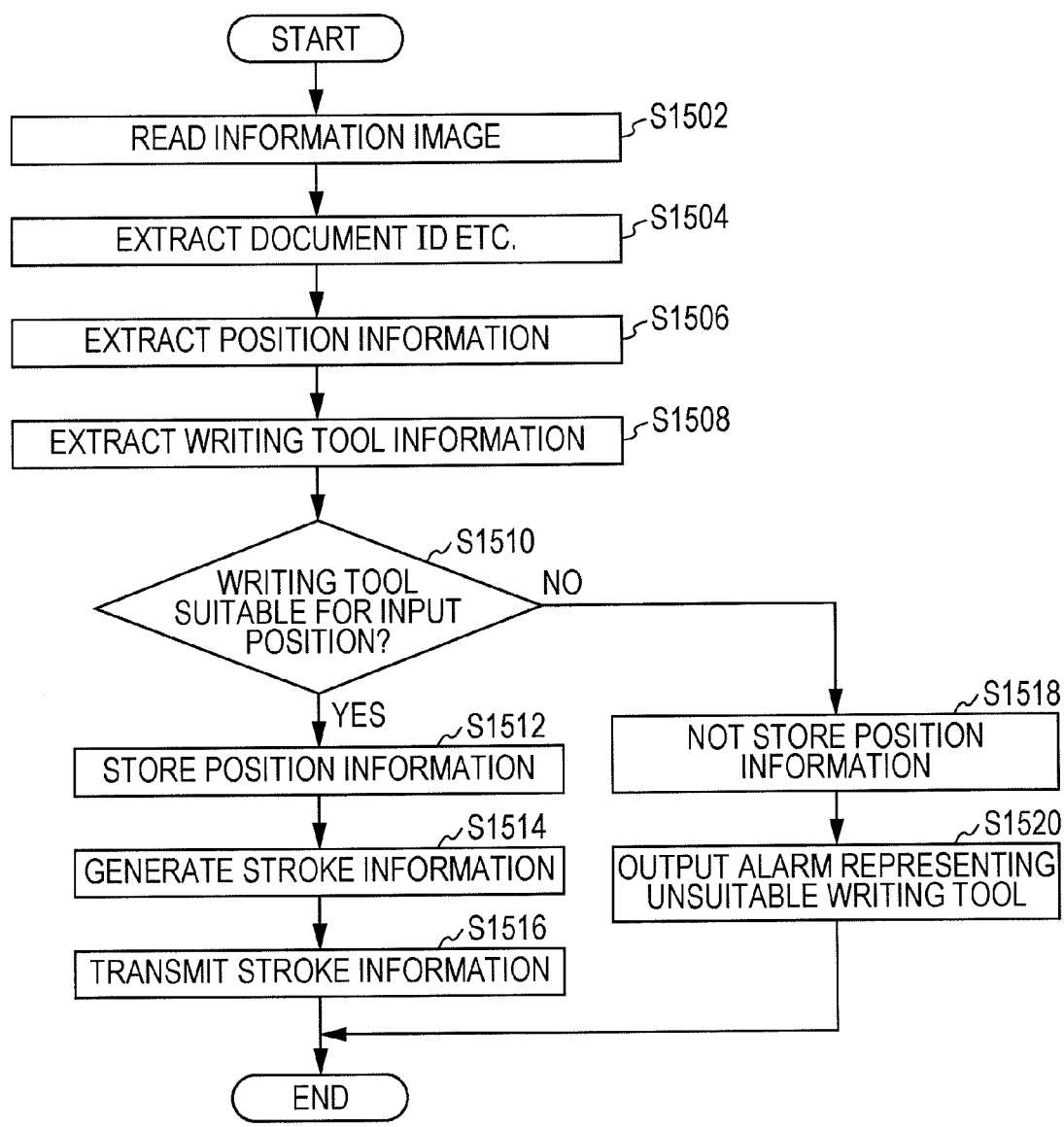
FIG. 15 is a flowchart illustrating another example of processing performed by the image reading apparatus according to the exemplary embodiment.

FIG. 15 is a flowchart illustrating another example of processing performed by the image reading apparatus according to the exemplary embodiment. In this example, the alarm module 1040 performs control to prevent position information from being stored and outputs a warning.

In step S1502, the reading module 1010 reads an information image printed on the document-with-information-image 340.

In step S1504, the document-related information extracting module 1026 extracts a document ID etc. from the information image.

In step S1506, the position information extracting module 1022 extract position information.

In step S1508, the writing tool information extracting module 1024 extracts writing tool information from the information image.

In step S1510, the determining module 1032 determines whether or not the digital pen is a writing tool suitable for the input position. If the digital pen is a suitable writing tool, the process proceeds to step S1512. Otherwise, the process proceeds to step S1518.

In step S1512, the position information extracted by the position information extracting module 1022 in step S1506 is stored.

In step S1514, the stroke information generating module 1050 generates stroke information.

In step S1516, the transmitting module 1060 transmits the stroke information.

In step S1518, the alarm module 1040 prevents the position information extracted in step S1506 from being stored.

In step S1520, the alarm module 1040 outputs an alarm representing that the digital pen is not a suitable writing tool.

In the above-described example, one type of writing tool information is embedded in an information image to be combined with an input field (the input field/writing tool information table 500 illustrated in FIG. 5 has a single writing tool information column 520). Alternatively, plural types of writing tool information may be used together. For example, an input field/writing tool information table 1700 may be used instead of the input field/writing tool information table 500. FIG. 17 is an explanatory diagram illustrating an example data structure of the input field/writing tool information table 1700. The input field/writing tool information table 1700 includes an input field ID column 1710, a writing tool information name A column 1720, a writing tool information A column 1730, a writing tool information name B column 1740, and a writing tool information B column 1750. The input field ID column 1710 stores input field IDs, which serve as information for uniquely identifying input fields in the system illustrated in FIG. 3. The writing tool information name A column 1720 stores the names of pieces of writing tool information stored in the writing tool information A column 1730. The writing tool information A column 1730 stores first writing tool information. The writing tool information name B column 1740 stores the names of pieces of writing tool information stored in the writing tool information B column 1750. The writing tool information B column 1750 stores second writing tool information. That is, two types of writing tool information is specified by AND. For example, the following information is set for the input field b: the input authority is general, and writing is to be performed using a digital pen with a blue ink.

In the above-described example, one type of writing tool information is stored in the writing tool information storage module 1034 of the digital pen 350 (the writing tool information table 1400 illustrated in FIG. 14 has a single writing tool information column 1410). Alternatively, plural types of writing tool information may be stored. For example, a writing tool information table 1800 may be used instead of the writing tool information table 1400. FIG. 18 is an explanatory diagram illustrating an example data structure of the writing tool information table 1800. The writing tool information table 1800 includes a writing tool information name A column 1810, a writing tool information A column 1820, a writing tool information name B column 1830, a writing tool information B column 1840, a writing tool information name C column 1850, and a writing tool information C column 1860. The writing tool information name A column 1810 stores the names of pieces of writing tool information stored in the writing tool information A column 1820. The writing tool information A column 1820 stores first writing tool information. The writing tool information name B column 1830 stores the names of pieces of writing tool information stored in the writing tool information B column 1840. The writing tool information B column 1840 stores second writing tool information. The writing tool information name C column 1850 stores the names of pieces of writing tool information stored in the writing tool information C column 1860. The writing tool information C column 1860 stores third writing tool information. In the case of a document combined with an information image generated using the input field/writing tool information table 1700 illustrated in FIG. 17, a user is capable of performing writing on the input field b using this digital pen. If the user tries to perform writing on another input field, an alarm representing that the digital pen is not suitable for writing is output.

This processing will be described. A pair of a writing tool information name and writing tool information embedded in an information image is extracted. If the writing tool information table 1800 has a writing tool information name and writing tool information that are the same as those extracted (an upper layer or the same layer if the information has a hierarchical structure), it is determined that the digital pen is suitable as a digital pen for performing writing at the position. If the writing tool information table 1800 does not have a writing tool information name that is the same as the writing tool information name extracted from the information image, or if the writing tool information table 1800 has a writing tool information name that is the same as the writing tool information name extracted from the information image but the writing tool information is different, an alarm representing that the digital pen is not suitable for writing is output.

Also, the writing tool information storage module 1034 of the digital pen 350 may store usage period information, which is information representing the period in which the digital pen 350 may be used. More specifically, a usage period may be an absolute period (for example, until 12 o'clock on Dec. 31, 2011) or a relative period (for example, 24 hours from when initial setting is performed through a predetermined operation). If the present time is not within the usage period, the determining module 1032 may determine that the digital pen is not suitable for writing. Particularly, the determination may be performed before performing processing of comparing the writing tool information extracted by the writing tool information extracting module 1024 with the writing tool information stored in the writing tool information storage module 1034.

Figure 19:
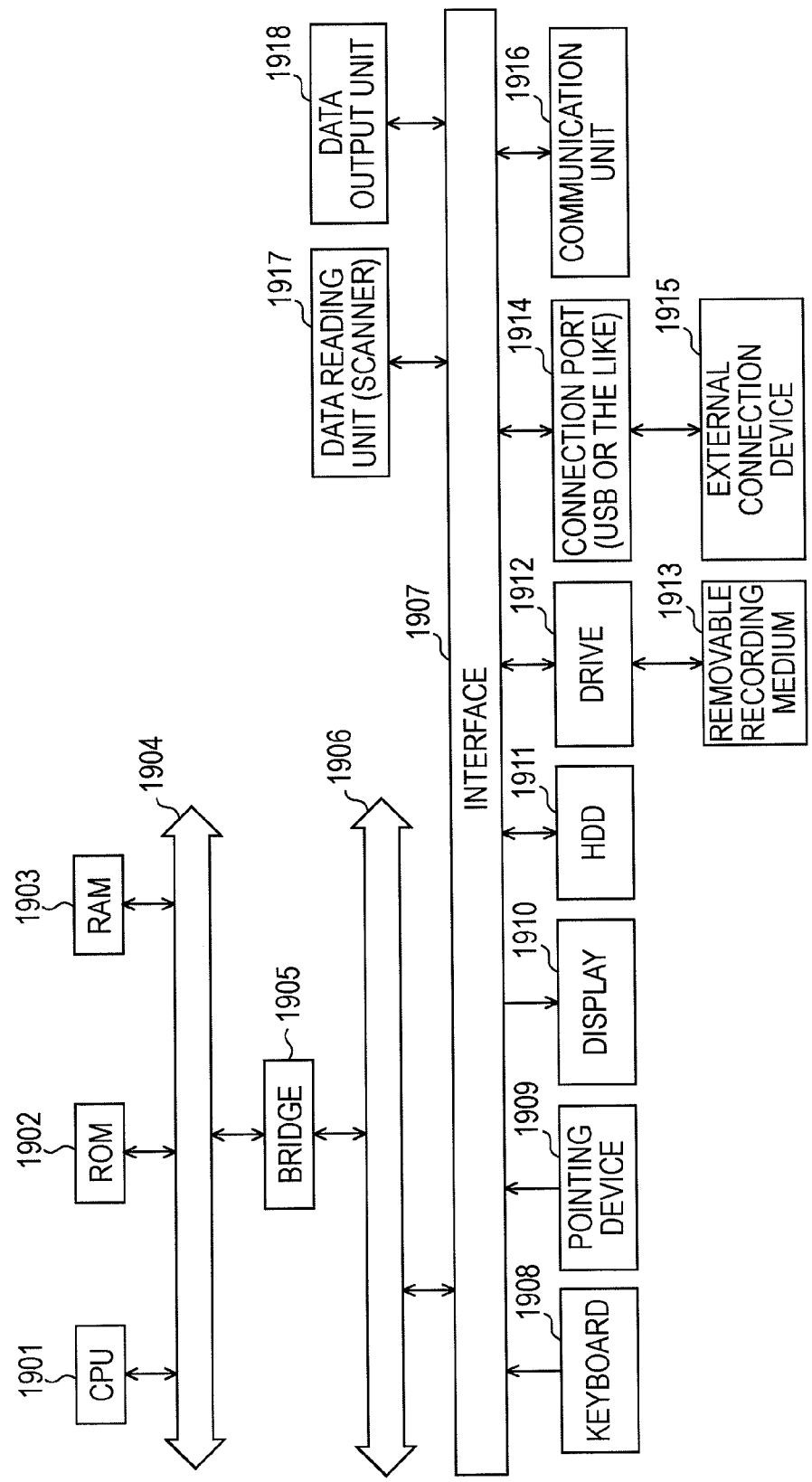
FIG. 19 is a block diagram illustrating an example hardware configuration of a computer that realizes the exemplary embodiment.

Hereinafter, an example hardware configuration of the information processing apparatus according to the exemplary embodiment (the image output apparatus, the document-creating information processing apparatus 310, the write-back information processing apparatus 360, and the image reading apparatus) will be described with reference to FIG. 19. The configuration illustrated in FIG. 19 is a configuration of a personal computer (PC) or the like, and includes a data reading unit 1917, such as a scanner, and a data output unit 1918, such as a printer. The digital pen 350 serving as the image reading apparatus includes a CPU 1901, a read only memory (ROM) 1902, a random access memory (RAM) 1903, the data reading unit 1917, a communication unit 1916, and a bus or the like for connecting these devices.

The CPU 1901 is a controller that executes processing in accordance with a computer program describing an execution sequence of the individual modules described above in the exemplary embodiment, that is, the writing tool information receiving module 110, the document layout receiving module 120, the document receiving module 130, the information image generating module 140, the information image combining module 150, the document creating application 312, the writing tool information specifying module 314, the stroke information extracting module 362, the write-back module 364, etc.

The ROM 1902 stores programs and operation parameters used by the CPU 1901. The RAM 1903 stores programs used for executing the CPU 1901, parameters that are changed as necessary in the execution, etc. These devices are connected to one another via a host bus 1904 constituted by a CPU bus or the like.

The host bus 1904 is connected to an external bus 1906, such as a peripheral component interconnect/interface (PCI) bus via a bridge 1905.

A keyboard 1908 and a pointing device 1909 such as a mouse are input devices operated by an operator. A display 1910 may be a liquid crystal display device or a cathode ray tube (CRT), and displays various pieces of information in the form of text or image information.

A hard disk drive (HDD) 1911 includes a hard disk, drives the hard disk, and causes a program executed by the CPU 1901 and information to be recorded or reproduced. A received electronic document, an information image, an electronic document combined with an information image, a document ID, etc. are stored in the hard disk. Furthermore, various computer programs, such as various data processing programs, are stored therein.

A drive 1912 reads data or a program recorded on a removable recording medium 1913, such as a magnetic disk, an optical disc, a magneto-optical disc, or a semiconductor memory, loaded in the drive 1912, and supplies the data or program to the RAM 1903 via an interface 1907, the external bus 1906, the bridge 1905, and the host bus 1904. The removable recording medium 1913 is usable as a data recording region similar to the hard disk.

A connection port 1914 is a port to which an external connection device 1915 is connected, and has a connection unit for USB, IEEE 1394, or the like. The connection port 1914 is connected to the CPU 1901, etc. via the interface 1907, the external bus 1906, the bridge 1905, and the host bus 1904. The communication unit 1916 is connected to a network and executes data communication processing with the outside. The data reading unit 1917 is a scanner, for example, and executes processing of reading a document. The data output unit 1918 is a printer, for example, and executes processing of outputting a document.

The hardware configuration of the image processing apparatus illustrated in FIG. 19 is one example configuration. The hardware configuration of the image processing apparatus is not limited to the configuration illustrated in FIG. 19, and another configuration may be employed as long as the modules described above in the exemplary embodiment may be executed therein. For example, some of the modules may be constituted by dedicated hardware (for example, application specific integrated circuit (ASIC) or the like), and some of the modules may be provided in an external system and may be connected via a communication line. Furthermore, plural apparatuses, each being the apparatus illustrated in FIG. 19, may be connected to one another via a communication line so as to operate in cooperation with one another. Alternatively, the apparatus illustrated in FIG. 19 may be incorporated into a copying machine, a facsimile machine, a scanner, a printer, or a multifunction apparatus (an image processing apparatus having two or more of a scanner function, a printer function, a copying function, a facsimile function, etc.).

The above-described program may be provided by being stored in a recording medium or via a communication medium. In that case, the above-described program may be regarded as a "computer readable recording medium having the program recorded thereon".

The "computer readable recording medium having the program recorded thereon" is a computer readable recording medium that has the program recorded thereon and that is used for installation, execution, or distribution of the program.

Examples of the recording medium include digital versatile discs (DVDs), for example, a DVD-R, a DVD-RW, a DVD-RAM, etc. based on the standard designed by the DVD forum, and a DVD+R, a DVD+RW, etc. based on the standard designed by DVD+RW. Also, examples of the recording medium include compact discs (CDs), for example, a CD-ROM, a CD recordable (CD-R), a CD rewritable (CD-RW), etc. Furthermore, examples of the recording medium include a Blu-ray Disc (registered trademark), a magneto-optical (MO) disc, a flexible disk (FD), magnetic tape, a hard disk, a ROM, an electrically erasable and programmable ROM (EEPROM (registered trademark)), a flash memory, a RAM, etc.

The above-described program or part of the program may be stored or distributed while being recorded on the recording medium. Alternatively, the program or part of the program may be transmitted via a wired network, such as a local area network (LAN), a metropolitan area network (MAN), a wide area network (WAN), the Internet, an intranet, or an extranet, or via a wireless communication network. Furthermore, the program or part of the program may be transmitted using a transmission medium including a combination of the foregoing media, or may be transmitted using carrier waves.

Furthermore, the foregoing program may be part of another program, and may be recorded on a recording medium together with another program. Also, the program may be recorded on plural recording media in a divided manner. The program may be recorded in any form, for example, in a compressed or encrypted form, as long as the program may be decompressed or decrypted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    an image output apparatus; and
    an image reading apparatus,
    the image output apparatus including:
        a writing tool information receiving unit configured to receive writing tool information, which is information about a writing tool suitable for an input field in a document;
        an information image generating unit configured to generate that an information image, which is used for extracting a writing position where writing is performed with the writing tool, the information image including position information representing a position in the document and the writing tool information received by the writing tool information receiving unit,
        a combining unit configured to combine the information image with the input field in the document; and
        a first output unit configured to output, onto a medium, the document in which the information image has been combined by the combining unit; and
    the image reading apparatus including:
        a writing tool information memory configured to store writing tool information, which is information about a writing tool;
        a reading unit configured to read the information image that has been output onto a medium by the image output apparatus;
        an extracting unit configured to extract the writing tool information from the information image on the document, and
        a determining unit configured to determine whether or not the writing tool is suitable for the input field by comparing the extracted writing tool information with the stored information about the writing tool.

2. The image processing apparatus according to claim 1, further comprising:
    a warning unit configured to output a warning in response to the determining unit determining that the writing tool is not suitable for performing writing at the position where reading has been performed by the reading unit.

3. The image processing apparatus according to claim 2, further comprising:
    a writing tool controller configured to prevent the writing tool from, performing writing in response to the determining unit determining that the writing tool is not suitable for performing writing at the position where reading has been performed by the reading unit.

4. The image processing apparatus according to claim 3, further comprising:
    a position information extracting unit configured to analyze the information image read by the reading unit in order to extract position information;
    a second output unit configured to output the position information extracted by the position information extracting unit; and
    an output controller configured to prevent the position information extracted by the position information extracting unit from being output to the second output unit in response to the determining unit determining that the writing tool is not suitable for performing writing at the position where reading has been performed by the reading unit.

5. The image processing apparatus according to claim 2, further comprising:
    a position information extracting unit configured to analyze the information image read by the reading unit in order to extract position information;
    a second output unit configured to output the position information extracted by the position information extracting unit; and
    an output controller configured to prevent the position information extracted by the position information extracting unit from being output to the second output unit in response to the determining unit determining that the writing tool is not suitable for performing writing at the position where reading has been performed by the reading unit.

6. The image processing apparatus according to claim 1, further comprising:
    a writing tool controller configured to prevent the writing tool from perforin writing in response to the determining unit determining that the writing tool is not suitable for performing writing at the position where reading has been performed by the reading unit.

7. The image processing apparatus according to claim 6, further comprising:
    a position information extracting unit configured to analyze the information image read by the reading unit in order to extract position information;
    a second output unit configured to output the position information extracted by the position information extracting unit; and
    an output controller configured to prevent the position information extracted by the position information extracting unit from being output to the second output unit in response to the determining unit determining that the writing tool is not suitable for performing writing at the position where reading has been performed by the reading unit.

8. The image processing apparatus according to claim 1, further comprising:
    a position information extracting unit configured to analyze the information image read by the reading unit in order to extract position information;
    a second output unit configured to output the position information extracted by the position information extracting unit; and
    an output controller configured to prevent the position information extracted by the position information extracting unit from being output to the second output unit in response to the determining unit determining that the writing tool is not suitable for performing writing at the position where reading has been performed by the reading unit.

9. An image processing apparatus comprising:
- a writing tool information receiving unit configured to receive writing tool information, which is information about a writing tool for an input field in a document;
- an information image generating unit configured to generate an information image, which is an image representing information, on the basis of position information representing a position in the document and the writing tool information received by the writing tool information receiving unit, the information image having the received writing tool in embedded therein;
- a combining unit configured to combine the information image with the input field in the document; and
- a first output unit configured to output, onto a medium, the document in which the information image has been combined by the combining unit.

10. An image processing apparatus comprising:
- a writing tool information memory configured to store writing tool information, which is information about a writing tool suitable for an input field in a document;
- a reading unit configured to read an information image that is used for extracting a writing position where writing is performed with the writing tool on a document that is combined with the information image, the information image represents information generated based on the writing tool information and position information, the position information represents a position in the document;
- an extracting unit configured to extract the writing tool information from the information image on the document; and
- a determining unit configured to determine, by comparing the extracted writing tool information with the stored information about the writing tool, whether or not the writing tool is suitable for the input field.

11. The image processing apparatus according to claim 10, further comprising:
- a warning unit configured to output a warning in response to the determining unit determines that the writing tool is not suitable for performing writing at the position where reading has been performed by the reading unit.

12. The image processing apparatus according to claim 11, further comprising:
- a writing tool controller configured to prevent the writing tool from performing writing in response to the determining unit determining that the writing tool is not suitable for performing writing at the position where reading has been performed by the reading unit.

13. The image processing apparatus according to claim 12, further comprising:
- a position information extracting unit configured to analyze information image read by the reading unit in order to extract position information;
- a second output unit configured to output the position information extracted by the position information extracting unit; and
- an output controller configured to prevent the position information extracted by the position information extracting unit from being output to the second output unit in response to the determining unit determining that the writing tool is not suitable for performing writing at the position where reading has been performed by the reading unit.

14. The image processing apparatus according to claim 11, further comprising:
- a position information extracting unit configured to analyze information image read by the reading unit in order to extract position information;
- a second output unit configured to output the position information extracted by the position information extracting unit; and
- an output controller configured to prevent the position information extracted by the position information extracting unit from being output to the second output unit in response to the determining unit determining that the writing tool is not suitable as a for performing writing at the position where reading has been performed by the reading unit.

15. The image processing apparatus according to claim 10, further comprising:
- a writing tool controller configured to prevent the writing tool from performing writing in response to the determining unit determining that the writing tool is not suitable performing writing at the position where reading has been performed by the reading unit.

16. The image processing apparatus according to claim 15, further comprising:
- a position information extracting unit configured to analyze information image read by the reading unit in order to extract position information;
- a second output unit configured to output the position information extracted by the position information extracting unit; and
- an output controller configured to prevent the position information extracted by the position information extracting unit from being output to the second output unit in response to the determining unit determining that the writing tool is not suitable for performing writing at the position where reading has been performed by the reading unit.

17. The image processing apparatus according to claim 10, further comprising:
- a position information extracting unit configured to analyze the information image read by the reading unit in order to extract position information;
- a second output unit configured to output the position information extracted by the position information extracting unit; and
- an output controller configured to prevent the position information extracted by the position information extracting unit from being output to the second output unit in response to the determining unit determining that the writing tool is not suitable for performing writing at the position where reading has been performed by the reading unit.

18. A non-transitory computer readable medium storing an image processing program for causing a computer to execute a process, the process comprising:
- receiving writing tool information, which is information about a writing tool for an input field in a document;
- generating an information image, which is an image representing information, on the basis of position information representing a position in the document and the received writing tool information, the information image having the received writing tool information embedded therein;
- combining the generated information image with the input field in the document; and
- outputting the document in which the information image has been combined onto a medium.

19. A non-transitory computer readable medium storing an image processing program for causing a computer to execute a process, the process comprising:
- storing writing tool information, which is information about a writing tool suitable for an input field in a document;
- reading an information image, which is used for extracting a writing position where writing is performed with the writing tool, the information image including position information representing a positing in the document and the writing tool information;
- analyzing the read information image in order to extract the writing tool information from the information image; and
- comparing the extracted writing tool information with the stored information about the writing tool in order to determine whether or not the writing tool is suitable for performing writing at a position where reading has been performed.

20. An image processing method comprising:
- receiving writing tool information, which is information about a writing tool suitable for an input field in a document;
- generating an information image, which is used for extracting a writing position where writing is performed with the writing tool, the information image including position information representing a position in the document and the received writing tool information;
- combining the generated information image with the input field in the document;
- outputting the document in which the information image has been combined onto a medium;
- storing the writing tool information, which is information about a writing tool;
- reading the information image that has been output onto the medium;
- extracting the writing tool information from the read information image; and
- comparing the extracted writing tool information with the stored information about the writing tool in order to determine whether or not the writing tool is suitable for the input field.

* * * * *